United States Patent [19]

Taguchi et al.

[11] Patent Number: 4,823,637
[45] Date of Patent: Apr. 25, 1989

[54] AUTOMATIC TRANSAXLE FOR AUTOMOTIVE VEHICLE

[75] Inventors: Hiromi Taguchi, Zama; Kazuyoshi Iwanaga, Atsugi, both of Japan

[73] Assignee: Nissan Motor Co., Ltd., Yokohama, Japan

[21] Appl. No.: 76,577

[22] Filed: Jul. 22, 1987

[30] Foreign Application Priority Data

Jul. 23, 1986 [JP] Japan ................... 61-111975

[51] Int. Cl.$^4$ ................................. F16H 57/02
[52] U.S. Cl. ................................. 74/606 R; 74/867
[58] Field of Search ............ 74/606 R, 700, 701, 74/867

[56] References Cited

U.S. PATENT DOCUMENTS

| | | | |
|---|---|---|---|
| 4,226,200 | 10/1980 | Morisawa et al. | 74/606 R |
| 4,506,561 | 3/1985 | Hayakawa | 74/606 R |
| 4,526,062 | 7/1985 | Sakakibara et al. | 74/701 X |
| 4,547,178 | 10/1985 | Hayakawa et al. | 74/867 X |
| 4,554,844 | 11/1985 | Hamano | 74/606 R |
| 4,628,754 | 12/1986 | Ideta et al. | 74/606 R X |
| 4,628,774 | 12/1986 | Iwanaga | 74/867 |
| 4,691,596 | 9/1987 | Nishikawa et al. | 74/867 X |

*Primary Examiner*—Dwight G. Diehl
*Attorney, Agent, or Firm*—Foley & Lardner, Schwartz, Jeffery, Schwaab, Mack, Blumenthal & Evans

[57] ABSTRACT

An accumulator is disposed in a space defined in the transaxle case adjacent two shafts and/or the intermeshing gears associated therewith. The bore of the accumulator is formed in a web or the like which reinforces the casing at the site where a bearing associated with one of the gears is disposed. The conduits which interconnect the accumulator with the valve body exhibit sufficient flow resistance to obviate the need for separate orifices.

8 Claims, 5 Drawing Sheets

AUTOMATIC TRANSAXLE FOR AUTOMOTIVE VEHICLE

BACKGROUND OF THE INVENTION

1. Field of the Invention

The present invention relates generally to an automatic automotive transaxle and more specifically to an arrangement wherein a shock attenuation accumulator is disposed separately from the remainder of the hydraulic control valve body in a manner which permits a reduction in the overall size of the valve body and therefore the transaxle.

2. Description of the Prior Art

Transaxles of the type which are disposed at one end of the engine tend to suffer from the problem that an adequate amount of space for disposition of the hydraulic valve control body is very difficult to find. Accordingly, in many instances the valve body is disposed either on the bottom or on the top of the casing in which the transmission and differential gear are disposed. In these types of transmissions it is often required to incorporate a multichamber accumulator into the hydraulic control system for the purposes of alleviating select and/or shift shock encountered during the various operations of the device. However, this provision enlarges the size of the valve body and increases the difficulty of arranging the same in the very limited amount of space available.

SUMMARY OF THE INVENTION

It is an object of the present invention to provide an accumulator which forms part of the hydraulic control system of an automotive transaxle in a location which is separate from the main section of the valve body and disposed in a space available within the transmission casing itself.

In brief, the above object is achieved by an arrangement wherein an accumulator is disposed in a space defined in the transaxle case adjacent two meshing gears and/or the shafts associated therewith. In the embodiments of the invention the bore of the accumulator is formed in a web or the like which reinforces the casing at the site where a bearing associated with one of the gears is disposed. The conduits which interconnect the accumulator with the valve body exhibit sufficient flow resistance to obviate the need for separate orifices.

More specifically, a first aspect of the present invention comes in the form of a transaxle which features a casing, said casing housing a mechanism which includes a bearing; a reinforcing portion in the housing for reinforcing the site in which said bearing is disposed; and an accumulator, said accumulator comprising.; a bore formed in said portion; a piston reciprocatively disposed in said bore to define a chamber; a conduit providing fluid communication between said accumulator and a control circuit associated with said mechanism.

A second aspect of the invention comes in the form of a automatic automotive transaxle which features a transaxle case; a gear train disposed in said case, said gear train having first and second rotating elements which are operatively interconnected, said rotating elements defining a space in said case; a reinforcing member formed in said case to reinforce the same against loads applied thereto from the rotating elements during operation of the gear train; and an accumulator disposed in said space, said accumulator being fluidly communicated with a control system of the gear train via conduits, said accumulator including a bore which is formed in said reinforcing member.

DETAILED DESCRIPTION OF THE PREFERRED EMBODIMENTS

Figure 1:
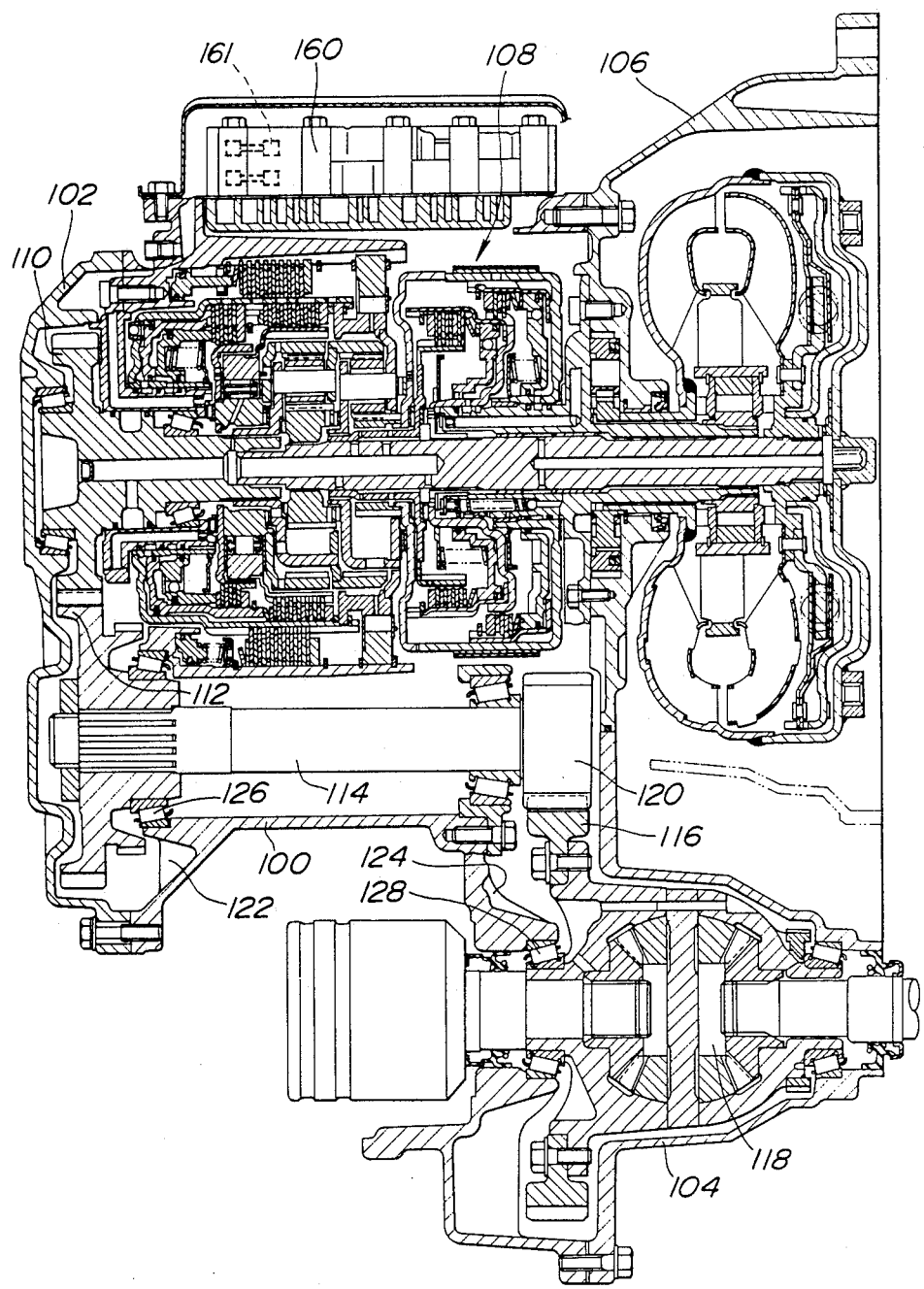
FIG. 1 is a side sectional view of a transaxle to which an embodiment of the present invention is applied.

FIG. 1 shows a transaxle to which the present invention is applied. In this arrangement the numeral 100 denotes a transaxle case, a side cover 102, a differential housing 104 and a torque converter cover 106 which are assembled in the illustrated manner. The planetary gear train 108 disposed in the transaxle case includes primary and secondary output gears 110, 112 and an output shaft 114. The final drive gear 116 of the differential gear 118 is operatively connected to the output shaft 114 through a final drive pinion 120.

The transaxle case 100 further includes reinforcing webs 122, 124. The first of these webs 122 is provided to reinforce the casing against the loads applied to the output shaft support bearing 126 while the second is to reinforce against the loads applied to bearing 128 of the final drive unit 118.

Figure 2:
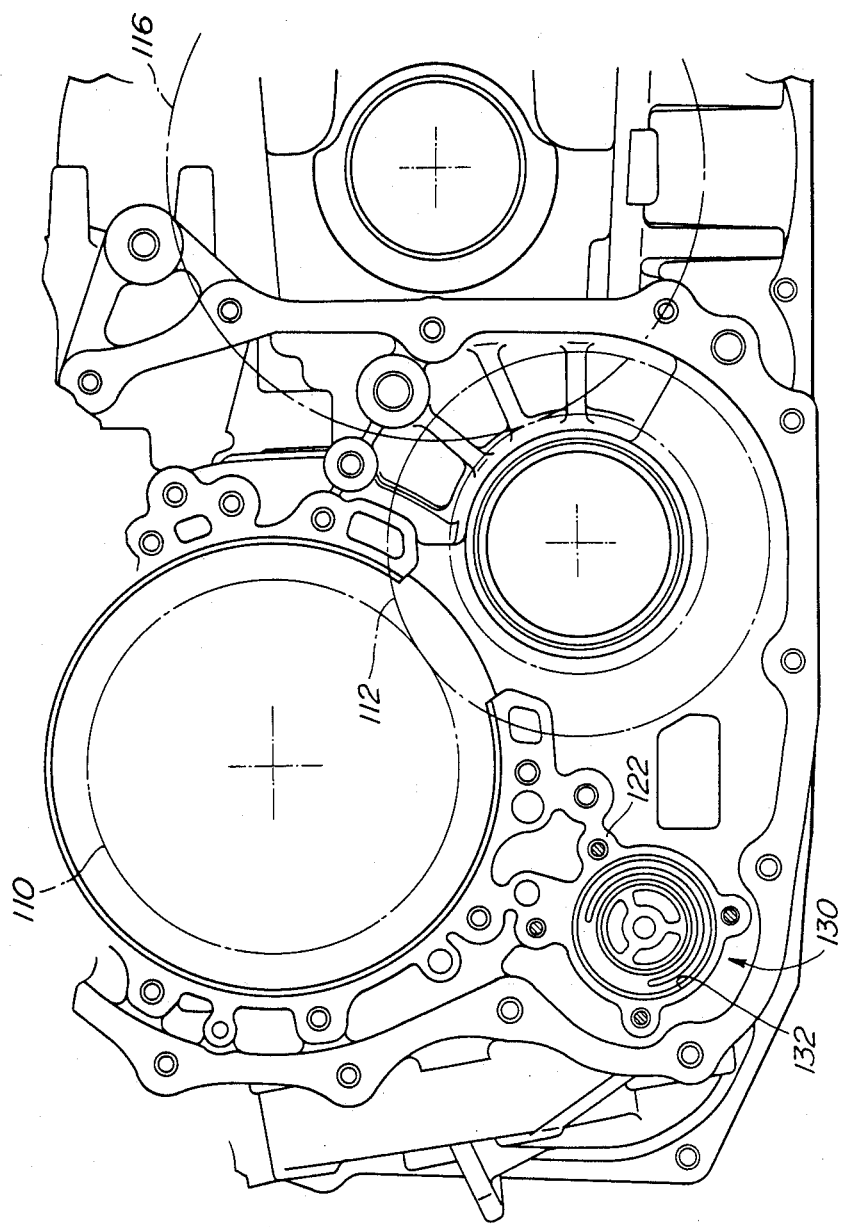
FIG. 2 is a rear elevation of the transaxle casing shown in FIG. 1 showing the bearing supports and like structure which support the various shafts of the transmission and disposition of a bore which forms vital part accumulator according to the first embodiment of present invention.
Figure 3:
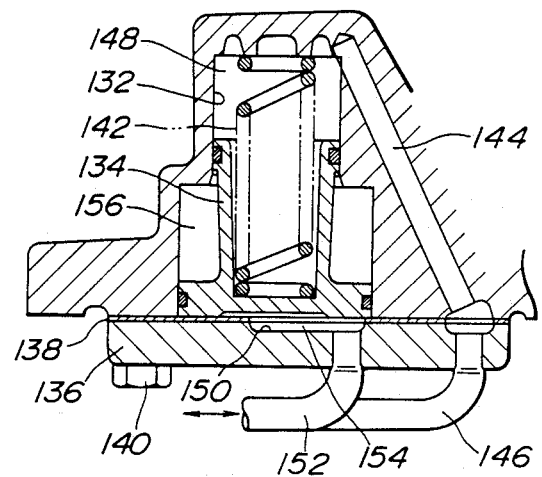
FIG. 3 of a sectional view showing the disposition of the accumulator in an end of the transmission casing according to a first embodiment of the present invention.
Figure 4:
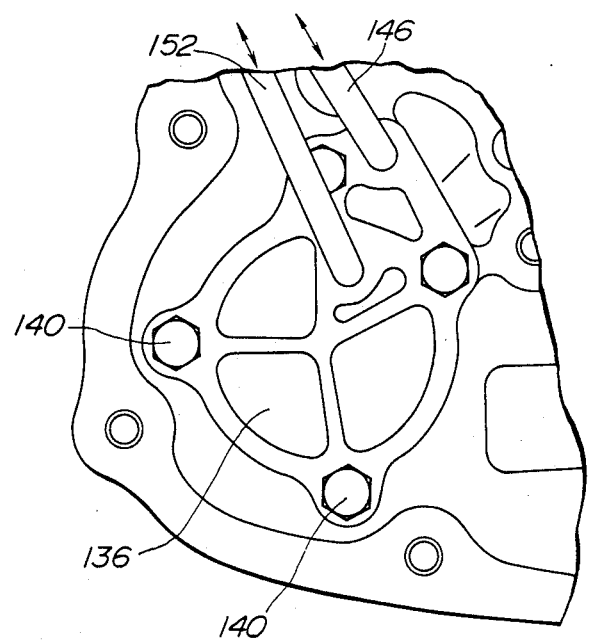
FIG. 4 a front elevation of the transmission casing showing the first embodiment in a fully assembled state.

As best seen in FIG. 2 the arrangement of the primary and secondary output gears 110, 112 leaves a space adjacent thereto. The first embodiment of the present invention takes advantage of the fact that web 122 is formed in this location and enables the provision of an accumulator thereat. As shown, in FIG. 3 the accumulator is defined by a stepped bore 132 in which a stepped piston 134 is reciprocatively disposed. The piston 134 is enclosed in the bore by a retainer 136. To ensure a hermetic seal a gasket 138 is interposed between the retainer 136 and the surface against which it is secured by bolts 140. A spring 142 is disposed in the bore 132 and arranged to bias the piston 134 toward the retainer 136.

An elongated bore 144 provides fluid communication between a pipe 146 connected to the retainer 136 and a first chamber 148 defined in the blind end of the bore 132. A recess 150 formed in the retainer 136 is fluidly communicated with a second pipe 152 connected to the retainer 136. This recess 150 forms part of a second chamber 154 of the accumulator arrangement defined at the open end of the bore 132. The chamber 156 defined between the shoulder of the bore and the large diameter land of the piston 134 in this instance is drained by the provision of a drain port (not shown).

The thus defined accumulator 130 is fluidly communicated with the appropriate ports formed in the valve body 160, having spool valves 161 therein, and shown in phantom, is a disposed on top of the casing 100 and/or other elements of the hydraulic control system via the pipes. As the pipes 146, 152 are relatively long they exhibit a flow resistance which provides an orifice effect and thus obviate the need to provide orifices per se.

Figure 5:
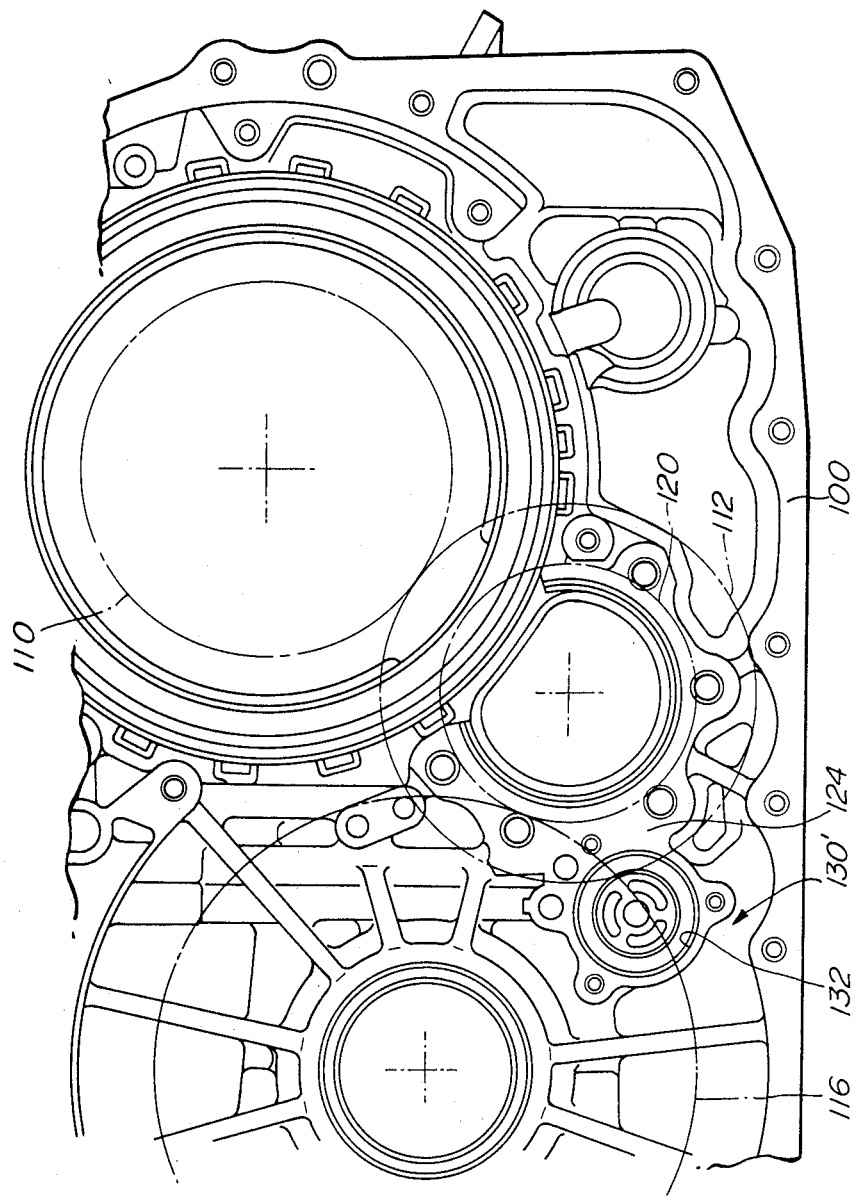
FIG. 5 is an end elevation of the transmission casing shown in FIG. 1 showing the disposition of an accumulator according to a second embodiment of the present invention.
Figure 6:
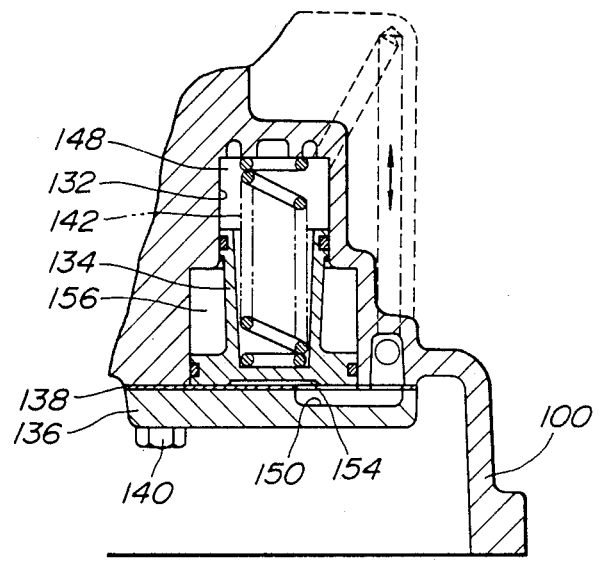
FIG. 6 is a sectional view of the accumulator shown in FIG. 5.
Figure 7:
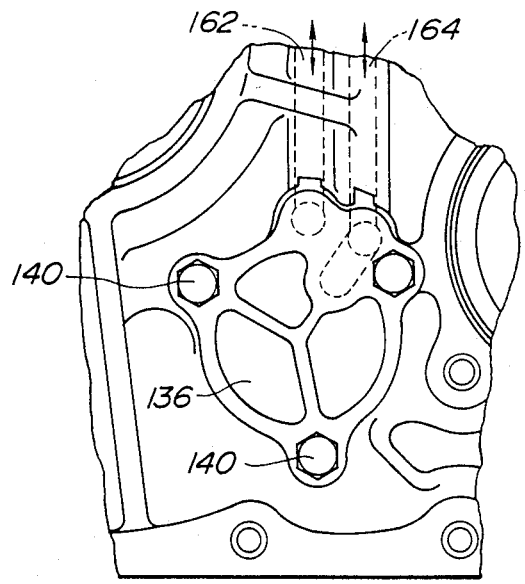
FIG. 7 is a front elevation of the transmission casing showing the second embodiment in a fully assembled state.

FIGS. 5 to 7 show a second embodiment of the present invention. In this arrangement the accumulator 130' disposed at the other end of the transmission case in close proximity to the final drive pinion 120 and the final drive gear 116. The second embodiment takes advantage of the web 124 in a manner similar to the first embodiment. It should be noted that this embodiment may be used alone or in combination with the first embodiment so as to enable the provision of two accumulators without increasing the size of the valve body.

In this embodiment the pipes 146, 152 are replaced with conduits 162, 164 which are bored through the casing in a manner as shown in FIGS. 6 and 7. As these conduits 162, 164 are relatively long they produce the same orifice effect as in the first embodiment and thus eliminate the need for providing elements which will provide said function.

What is claimed is:

1. A transaxle, comprising:
   a casing, said casing housing a mechanism which includes a bearing;
   a reinforcing portion in the housing for reinforcing a site in which said bearing is disposed; and
   an accumulator, said accumulator having a first bore formed in said reinforcing portion, said bore defining a chamber, a piston reciprocatively disposed in said first bore, and a conduit providing fluid communication between said accumulator and a control circuit associated with said mechanism.

2. A transaxle as claimed in claim 1, further comprising:
   a second reinforcing portion which reinforces a site where a second bearing is disposed; and
   a second accumulator, said second accumulator having a second bore formed in said second portion and defining a second chamber, a piston reciprocatively disposed in said second bore, and a conduit providing fluid communication between said accumulator and said control circuit.

3. A transaxle comprising:
   a casing, said casing housing a mechanism which includes a bearing;
   a first reinforcing portion in the housing for reinforcing a site in which said bearing is disposed; and
   an accumulator, said accumulator having a first bore formed in said first reinforcing portion, said bore defining a chamber, a piston reciprocatively disposed in said first bore, and a conduit providing fluid communication between said accumulator and a control circuit associated with said mechanism,
   said control circuit including a valve body in which a plurality of valves are disposed, said valve body being disposed at a site which is distal from said first bore.

4. An automatic automotive transaxle, comprising:
   a transaxle case
   a gear train disposed in said case, said gear train having first and second rotating elements which are operatively interconnected, said rotating elements defining a space in said case;
   a reinforcing member formed in said case to reinforce the same against loads applied thereto from the rotating element during operation of the gear train; and
   an accumulator disposed in said space, said accumulator being fluidly communicated with a control system of the gear train via conduits, said accumulator including a bore which is formed in said reinforcing member.

5. An automatic automotive transaxle, comprising:
   a transaxle case;
   a gear train disposed in said case, said gear train having first and second rotating elements which are operatively interconnected, said rotating elements defining a space in said case;
   a reinforcing member formed on said case to reinforce the same against loads applied thereto from the rotating elements during operation of the gear train;
   an accumulator disposed in said space, said accumulator being fluidly communicated with a control system of the gear train via conduits, said accumulator including a bore which is formed in said reinforcing member; and
   a valve body which forms a part of the gear train control system, said valve body disposed on a site which is located on a side of said case, said valve body and said accumulator being fluidly interconnected by conduits, said conduits exhibiting a flow resistance which provides an orifice effect.

6. A transaxle as claimed in claim 5, wherein said conduits take the form of pipes which are non integral with said case.

7. A transaxle as claimed in claim 5 wherein said conduits take the form of bores formed in said case.

8. An automatic automotive transaxle comprising:
   a transaxle case;
   a gear train disposed in said case, said gear train having first and second rotating elements which are operatively interconnected, said rotating elements defining a space in said case;
   a reinforcing member formed in said case to reinforce the same against loads applied thereto from the rotating elements during operation of the gear train;
   an accumulator disposed in said space, said accumulator being fluidly communicated with a control system of the gear train via conduits, said accumulator including a bore which is formed in said reinforcing member; and
   a valve body which forms a part of the gear train control system, said valve body being disposed on a site which is located on a surface of said case and having a plurality of valves therein, said valve body and said accumulator being fluidly interconnected by conduits, said conduits exhibiting a flow resistance which provides an orifice effect.

* * * * *